July 21, 1931. A. M. REMINGTON 1,815,215
SAW GAUGE
Filed July 6, 1929
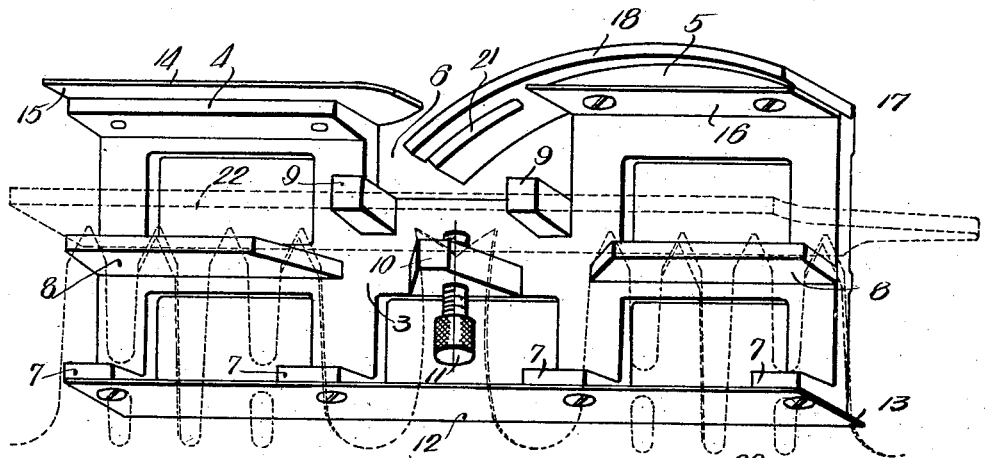
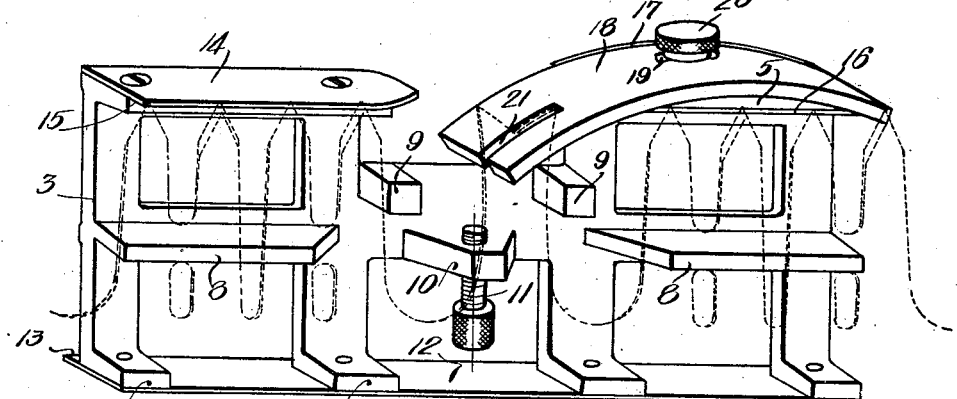
INVENTOR
Alfred M. Remington
By Roberts, Cushman & Woodbury
his Attorneys Patented July 21, 1931

1,815,215

UNITED STATES PATENT OFFICE

ALFRED M. REMINGTON, OF FITCHBURG, MASSACHUSETTS, ASSIGNOR TO SIMONDS SAW AND STEEL COMPANY, OF FITCHBURG, MASSACHUSETTS, A CORPORATION OF MASSACHUSETTS

SAW GAUGE

Application filed July 6, 1929. Serial No. 376,482.

This invention relates to tools or jigs for use in filing saws, and pertains more particularly to improvements in gauges adapted to be applied to cross cut saws for accurately gaging the height of the raker teeth during the filing operation.

The cutting edge of cross cut saws includes a series of cutting teeth and intervening raker teeth equally spaced along the saw edge, alternate cutting points being beveled left and right to mark a longitudinal groove on the opposite sides of the kerf, and the bifurcated points of the rakers being spaced below the cutting points to remove the wood between the lines marked by the cutting teeth. In filing a saw it is customary first to dress, file and bevel the cutting points, and then to file the raker teeth at a predetermined level below the plane of the cutting points. The successful operation of the saw depends largely upon the accurate filing of the saw teeth and the proper height of the raker teeth with respect to the cutting points.

It is accordingly the principal object of the present invention to provide a simple and handy tool designed to serve as an accurate gaging member for rapidly jointing the cutting points and filing the raker teeth, the raker gaging element of the device being readily adjustable for the desired height of the curved points of the raker teeth. Another object resides in the provision of a curved raker gaging plate having a recess, preferably in the form of a slot, in its end to receive the toothed edge of the saw, the plate being longitudinally slidable to vary the relative position of its slot so that the raker teeth may be filed at a predetermined height while the side of the tooth being filed abuts the end of said slot to prevent relative longitudinal movement between the saw and the gauge.

A recommended embodiment of the invention is illustrated in the accompanying drawings; in which, Figs 1 and 2 are perspective views of the improved tool applied for use in dressing the cutting points and filing the raker teeth respectively, the saw teeth being shown in broken lines.

The particular embodiment chosen for the purpose of illustration comprises a rigid frame or body 3 having transverse projections 4 and 5 spaced from each other at its top and defining an intermediate recess 6; base legs 7 projecting in the same direction as the top member 4 and 5; side fins or guides 8; upper file holding lugs 9; and a lower file holding lug 10 mounting a set screw 11. The end faces of these projecting elements are preferably squared and disposed in the same plane to seat against the side of the saw during use. A base plate 12 is secured to the bottom of the legs 7 with one edge registering with the squared ends of said legs and with its opposite edge projecting rearwardly beyond the legs as at 13.

An upper guide plate 14 is mounted on the projection 4 with its forward side extending beyond the squared end thereof to furnish an abutment 15, and a second upper guide plate 16 is secured beneath the other top projection 5, in line with the plate 14. The upper surface of the projection 5 is preferably curved longitudinally and has a projecting lip 17 along its rearward side. A curved raker gauge plate 18 is arranged to slide longitudinally over the curved upper face of the member 5, one side edge of said plate being guided by the lip 17, and the plate having a central slot 19 receiving a threaded pin mounting a locking knot 20. The inner end of the curved plate 18 extends into the frame recess 6 and has a longitudinal slot 21 adapted to receive a raker tooth of the saw. The position of the plate 18 may be quickly adjusted by releasing the locking knot 20, sliding the plate longitudinally upon its curved support 5 and tightening the knot 20 when the slot 21 is disposed at its desired vertical position with respect to the aligned guide plates 14 and 16.

When employed for dressing the cutting points of the saws, a file, indicated by broken lines at 22, is clamped between the lugs 9 and lug 10 by means of the screw 11, as shown in Fig. 1, and the tool is placed against the side of the saw with the bottom face of the file overlying the cutting points. The tool is then moved longitudinally along the saw, the squared edges of the parts 7 and 8 serving as guides during the jointing operation.

To file the raker teeth (Fig. 2), the tool is placed against the side of the saw with one of the raker teeth received within the slot 21 of the gauge plate 18 and with the cutting points abutting the overlapping margin 15 of the plate 14 and the under side of the plate 16. The side edge of the selected raker tooth seats at the end of the slot 21 to prevent relative longitudinal movement between the saw and the tool in one direction, and the relative vertical position of said slot end determines the adjusted height of the raker teeth. One of the points of the raker teeth is then filed down until the file rides on the upper face of the hardened metal plate 18. This point is thus accurately curved along the curvature of the gauge plate 18 and its height is correctly regulated by the adjustment of said plate. The tool is then advanced successively to succeeding rake teeth and then reversed on the opposite side of the saw to gauge the filing of the other points of the rakers. Thus all the raker teeth are accurately filed at the desired level and with uniform curvatures.

In order to verify the level of the cutting teeth and the clearance between the cutting points and the rakers, the tool may be inverted and placed beside the saw with the projecting margin 13 of the base plate 12 resting upon the points of the cutting teeth.

While a tool constructed as above described is particularly efficient in performing its intended purposes to insure the accurate filing of cross cut saws, it will be understood that structural details of the device may be varied to suit particular purposes without departing from the essence of this invention as defined in the appended claims. A particular feature of the invention is the provisions of a tool of this type in which a curved raker gauge plate having a tooth-receiving slot in its end is mounted for longitudinal sliding movement to vary the vertical position of the slot with respect to cutting tooth guides provided on the device.

I claim:

1. A tool of the class described comprising a frame, a fixed guide carried by the frame and adapted to seat upon the cutting teeth of a saw, a curved gauge plate of fixed curvature having a recess therein to receive a raker tooth of the saw, and means for supporting the gauge plate from the frame for movement longitudinally substantially along the arc of curvature of the gauge plate so as to vary the position of said recess with respect to said guide.

2. A tool of the class described comprising a frame, a fixed guide carried by the frame and adapted to seat upon the cutting teeth of a saw, a support carried by the frame in spaced alignment with said guide and having a curved face, a gauge plate curved in one direction complementary to the curved face and slidable thereover, said plate having a slot in its curved portion to receive a raker tooth of the saw, and means for locking the slidable plate in different positions with respect to said guide to adjust the position of said slot with respect to said guide.

3. A tool of the class described comprising a frame having a recess in its top, aligned guide members carried by the frame at opposite ends of the recess, said guide members having flat bottom faces adapted to rest upon the cutting teeth of a saw, one of said members having a longitudinally curved upper surface, a gauge plate longitudinally curved complementary to said curved upper surface and slidable longitudinally thereon, one end of said plate extending downwardly into said recess and having a longitudinal slot adapted to receive a raker tooth of the saw, and means for restraining movement of the slidable plate on said curved upper surface to adjust the position of said slot with respect to said guide members.

Signed by me at Fitchburg, Massachusetts this third day of July, 1929.

ALFRED M. REMINGTON.